(12) United States Patent
Alessandria et al.

(10) Patent No.: US 8,983,645 B2
(45) Date of Patent: Mar. 17, 2015

(54) SYSTEM FOR THE FLEXIBLE PRODUCTION OF A PLURALITY OF TYPES OF MOULDED FOOD PRODUCTS, PARTICULARLY CHOCOLATE-BASED PRODUCTS AND THE LIKE

(75) Inventors: Eugenio Alessandria, Pocapaglia (IT); Massimo Giacosa, Alba (IT)

(73) Assignee: Soremartec S.A., Findel (LU)

( * ) Notice: Subject to any disclaimer, the term of this patent is extended or adjusted under 35 U.S.C. 154(b) by 1278 days.

(21) Appl. No.: 12/665,131

(22) PCT Filed: Jun. 19, 2008

(86) PCT No.: PCT/IB2008/052411
§ 371 (c)(1),
(2), (4) Date: Dec. 17, 2009

(87) PCT Pub. No.: WO2009/001250
PCT Pub. Date: Dec. 31, 2008

(65) Prior Publication Data
US 2010/0179676 A1    Jul. 15, 2010

(30) Foreign Application Priority Data
Jun. 22, 2007    (IT) ............................... TO2007A0452

(51) Int. Cl.
*G06F 19/00*    (2011.01)
*A23P 1/10*    (2006.01)
(Continued)

(52) U.S. Cl.
CPC ................. *A23P 1/105* (2013.01); *A23G 1/205* (2013.01); *A23G 1/26* (2013.01); *A23G 3/0252* (2013.01);
(Continued)

(58) Field of Classification Search
USPC ............ 700/115, 116, 117, 118, 197; 99/427, 99/443 C; 426/231, 389, 512, 515, 584, 426/658, 660
See application file for complete search history.

(56) References Cited

U.S. PATENT DOCUMENTS 7,423,527 B2 *   9/2008   Bajwa et al. ............. 340/539.16
7,797,949 B2 *   9/2010   Mansuino ........................ 62/3.2
(Continued)

FOREIGN PATENT DOCUMENTS

CA       2196474 A1    7/1998
WO       0182009 A3    11/2001
(Continued)

*Primary Examiner* — Kenneth Lo
*Assistant Examiner* — Chad Rapp
(74) *Attorney, Agent, or Firm* — Rothwell, Figg, Ernst & Manbeck, P.C.

(57) ABSTRACT

The system comprises a conveyor for conveying a plurality of molds along a production path on which is located a plurality of stations, each of which can execute at least one corresponding operation.
Each mold carries an electronic identification device including memory devices from and to which information or data can be read and written without contact by means of an antenna.
Each station is provided with an electronic unit including a processor, having memory devices and at least one antenna, and designed to read and/or write information or data from or to the memory devices of a mold passing through the station. An initial input station transfers or writes to the memory devices of each mold passing through it information identifying the products to be formed in the mold and relating to corresponding forming operations.
The additional stations can be controlled selectively in a plurality of predetermined modes for the forming of a corresponding plurality of different product types, the electronic unit of each station being capable of selectively modifying the mode of execution of at least one of its operations, in accordance with operating information read from the memory devices associated with the mold passing through it.

22 Claims, 5 Drawing Sheets

(51) Int. Cl.
  *A23G 1/20* (2006.01)
  *A23G 1/26* (2006.01)
  *A23G 3/02* (2006.01)
  *A23G 3/20* (2006.01)
  *G05B 19/418* (2006.01)

(52) U.S. Cl.
  CPC ............ *A23G 3/0278* (2013.01); *A23G 3/2023* (2013.01); *A23G 3/2046* (2013.01); *G05B 19/4183* (2013.01); *G05B 2219/31283* (2013.01); *G05B 2219/31322* (2013.01)
  USPC ............................ 700/116; 426/389; 426/512

(56) References Cited

U.S. PATENT DOCUMENTS

| | | | |
|---|---|---|---|
| 2006/0200261 A1* | 9/2006 | Monette et al. | 700/108 |
| 2006/0206235 A1* | 9/2006 | Shakes et al. | 700/216 |
| 2007/0254080 A1* | 11/2007 | Schackmuth et al. | 426/523 |
| 2008/0292759 A1* | 11/2008 | Palmer | 426/389 |

FOREIGN PATENT DOCUMENTS

| | | |
|---|---|---|
| WO | 03071880 A2 | 9/2003 |
| WO | 2005107481 A2 | 11/2005 |

\* cited by examiner

SYSTEM FOR THE FLEXIBLE PRODUCTION OF A PLURALITY OF TYPES OF MOULDED FOOD PRODUCTS, PARTICULARLY CHOCOLATE-BASED PRODUCTS AND THE LIKE

CROSS REFERENCE TO RELATED APPLICATION(S)

This application is a 35 U.S.C. §371 National Phase Entry Application from PCT/IB2008/052411 filed Jun. 19, 2008, and designating the United States. This application also claims the benefit of Italian Patent Application No. TO2007A000452 filed Jun. 22, 2007, the disclosure of which is incorporated herein in its entirety by reference.

The present invention relates in a general way to a system for the production of moulded food products, and specifically (but not exclusively) to chocolate-based products and the like.

In the technology used for the production of moulded food products, such as chocolates with or without fillings, pralines and the like, various products may frequently have the same structure but differ in the characteristics of one or more of their constituents. For example, a "family" of products of this kind may have a common structure, including a shell formed by a pair of half-shells or wafer sheets, provided with an outer coating and containing a filling and a dried fruit or nut. For such a "family", it is possible to make differentiated products, currently referred to as different "flavours", by varying the filling and/or the associated dried fruit or nut (which may be, for example, an almond, a hazel-nut or a pistachio) and/or by varying the outer coating or a garnish thereon, made for example by applying and/or incorporating chopped meringue and/or hazel-nut or grated coconut (known as "sprinkles").

For the manufacture of such families of products, the production systems used at present require a specific batch production process for each product or "flavour" (using different shaping machines, or using the same machine at different times), these products then being set aside and subsequently collected, for example, in order to form "mixed" packages with the requisite combinations of "flavours".

This production method is not particularly efficient.

One object of the present invention is to propose a system for the flexible and substantially simultaneous production of a plurality of types of moulded food products which differ from each other, while overcoming the drawbacks of the systems used up to the present time.

These and other objects are achieved according to the invention with a system comprising:

a conveyor for conveying in sequence a plurality of moulds along a predetermined production path on which is located a plurality of stations or devices, each of which can execute at least one corresponding operation;

each mould carrying a corresponding electronic identification device including memory devices from and to which information or data can be read and written without contact, by means of an associated antenna or the like;

each station or device being provided with at least one corresponding electronic unit including a processor, having associated memory devices and at least one antenna or the like, and designed to read and/or write information or data from or to the memory devices of a mould passing through the station;

the system comprising at least one initial input station whose electronic unit is designed to transfer or write to the memory devices of a mould passing through it operating information identifying the products to be formed in the mould and information relating to the forming operations, and at least one intermediate station which can be controlled selectively in a plurality of predetermined modes for the forming of a corresponding plurality of different product types, the electronic unit of this station being capable of selectively modifying the mode of execution of at least one of its operations in accordance with operating information read from the memory devices associated with each mould passing through it.

The memory devices associated with the moulds are conveniently of the rewriteable type, and the system also comprises a final "validation" and cancellation station, which can selectively cancel information or data in the memory devices of the mould passing through it on each occasion.

Further characteristics and advantages of the invention will be made clear by the following detailed description, provided purely by way of non-limiting example, with reference to the appended drawings, in which.

Figure 1:
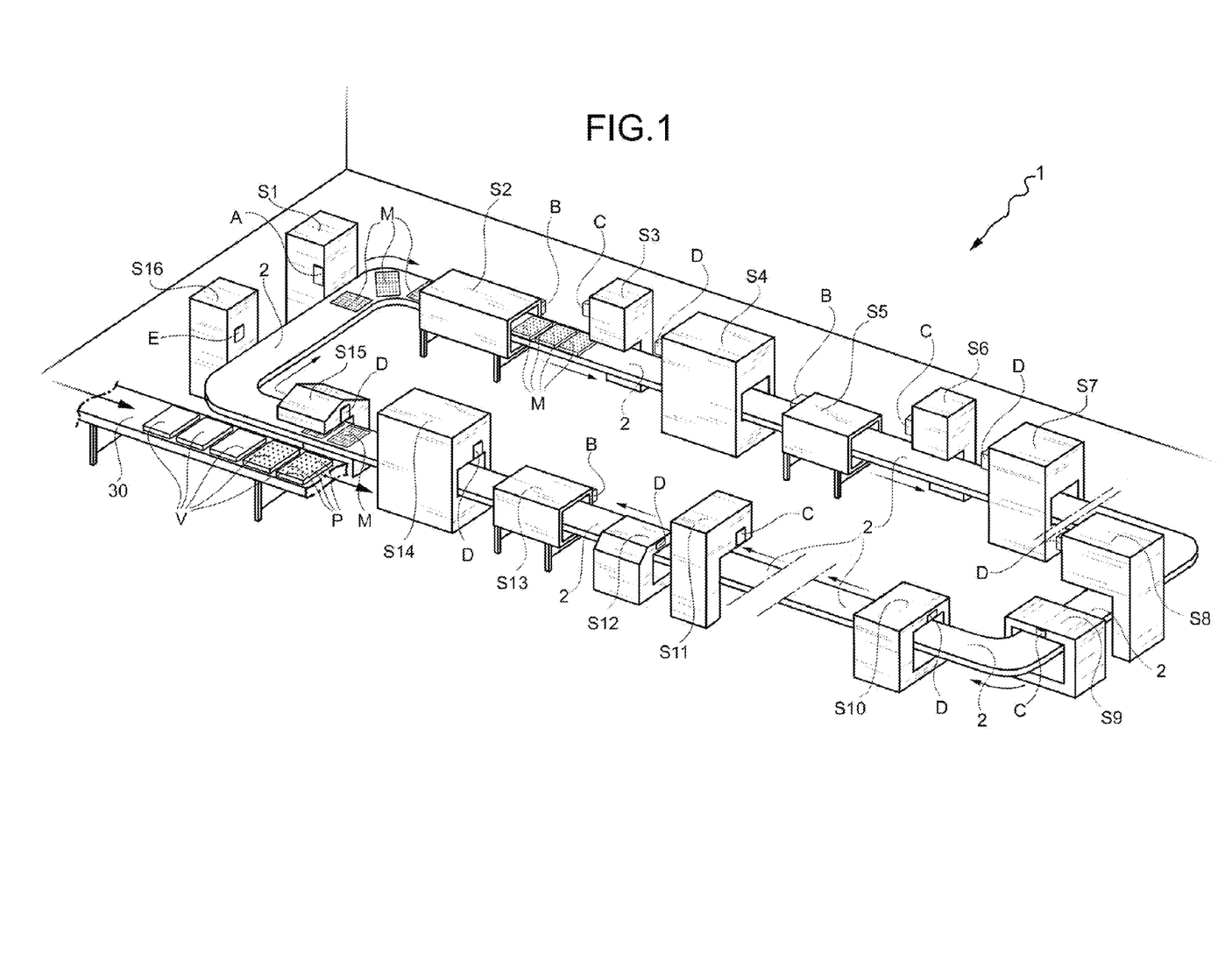
FIG. 1 is a schematic perspective view of a flexible production system according to the present invention.

In FIG. 1, the number 1 indicates the whole of a system according to the invention for the flexible production of a plurality of types of moulded food products which differ from each other, for example, in their shape and/or their composition.

In the illustrated example of embodiment, the system 1 comprises a conveyor 2 for conveying in sequence a plurality of moulds M along an essentially loop-shaped production path, on which is located a plurality of stations or devices S1-S16, each designed to execute at least one corresponding operation.

Figure 2:
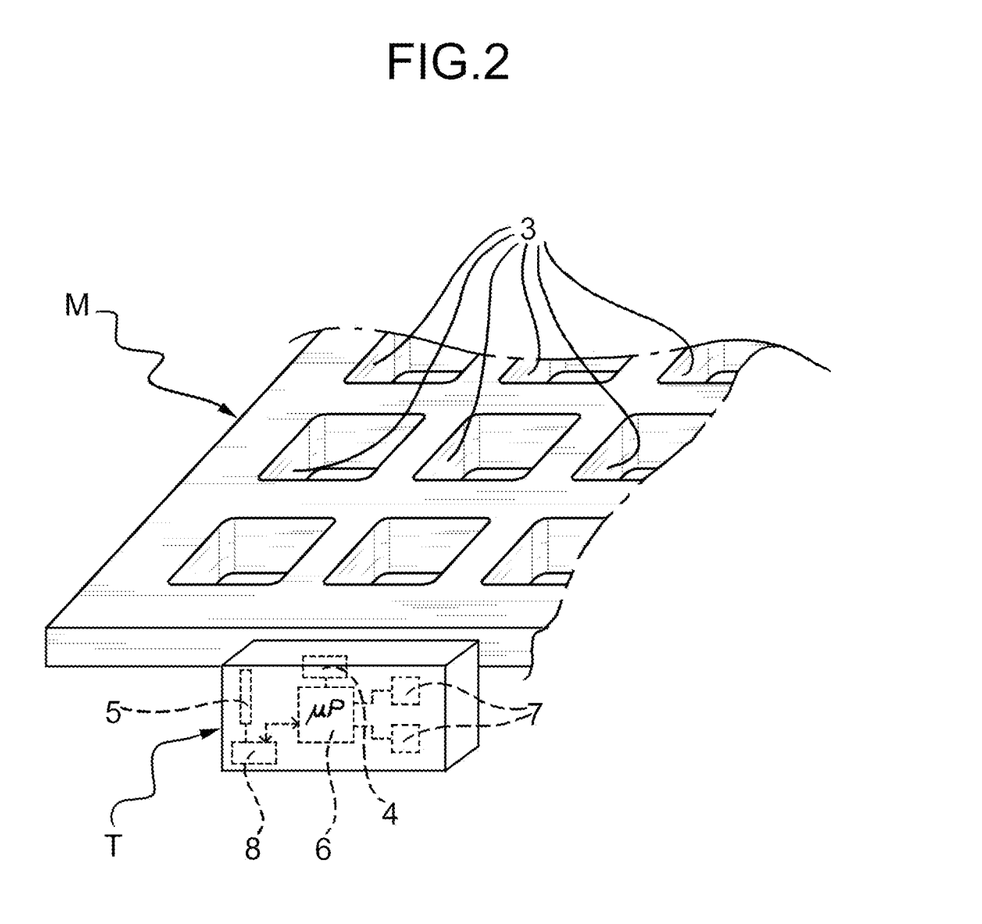
FIG. 2 is a partial perspective view which shows a portion of a mould used in a flexible production system according to the present invention.

With reference to FIG. 2, in the illustrated example each mould M has a corresponding plurality of housings or cells 3 for forming corresponding moulded products such as filled chocolates and the like.

Each mould M carries a corresponding electronic identification device, indicated as a whole by T in FIG. 2. This device, which may be what is known as an RFID, includes integrated electronic memory devices 4, from and to which information or data can be read and written, and if necessary rewritten, without contact, by means of an associated antenna or the like 5. The identification device T associated with each mould M can also comprise a microprocessor 6 and if necessary one or more sensors 7 for supplying electrical signals indicating the value of a corresponding physical and/or chemical quantity which is monitored, such as temperature or moisture content, this value being writeable to the associated memory devices 4 and/or being directly transmitted to the electronic unit of one or more stations S1-S16, which are described below with reference to FIG. 4.

The identification device T in the drawing is shown in a position adjacent to the mould M, but it could also be "embedded" or otherwise incorporated into the mould itself.

An interface circuit 8 can be interposed between the antenna 5 and the microprocessor 6, if the latter is present.

The example illustrated in FIG. 1 shows sixteen stations S1-S16, each of which is associated with a corresponding electronic unit which, as described more fully below, includes a processor with associated memory devices and at least one antenna or the like. This processor is designed to read and/or write information or data from or to the memory devices 4 of each mould M passing through the station.

In particular, the station S1 is an initial input station. It is associated with an electronic unit indicated by A in FIGS. 1 and 4. This unit comprises a processor 9 with associated memory devices 10. The processor 9 is connected to a communications interface device 11 connected by a communication line 12 to an in-house communication network.

Figure 4:
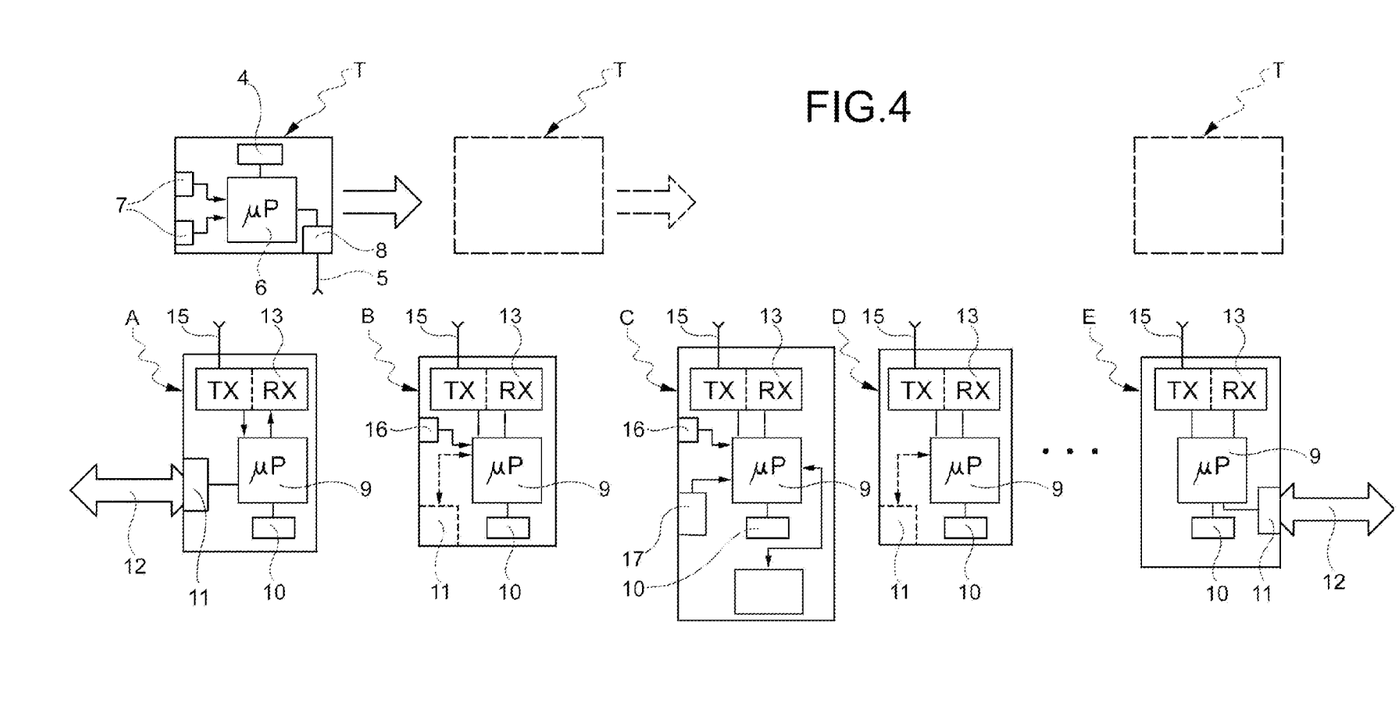
FIG. 4 is a block diagram showing the architecture of electronic units associated with various stations of a flexible production system according to the invention.

The microprocessor 9 is connected to at least one antenna or the like 15 by means of transmission interface devices indicated as a whole by 13.

The electronic unit A of the initial input station S1 receives product production orders from the in-house network, according to the desired mixes, through the communication line 12. This electronic unit A is designed to transfer or write to the memory devices 4 associated with each mould M passing through it corresponding operating information which identifies the products to be formed in the mould and the corresponding forming operations.

Downstream of the station S1 there is a station S2, which in the illustrated example is a station for heating the moulds M. This station is also associated with an electronic unit, indicated as a whole by B in FIGS. 1 and 4. This electronic unit has an architecture similar to that of the unit A, and also comprises a processor 9 with associated memory devices 10, a transmission/reception interface 13, and at least one antenna or the like 15. The electronic unit B can also comprise (at least) a sensor 16 for supplying electrical signals indicating the value of a corresponding physical and/or chemical quantity which is monitored, particularly the temperature to which the moulds M are heated. The processor 9 can then be designed, in particular, to transcribe the detected value of this quantity to the memory devices 4 associated with the moulds M as they pass through the associated station S2, and/or to transmit this value to the reception unit or units of the control station S16.

Figure 3:
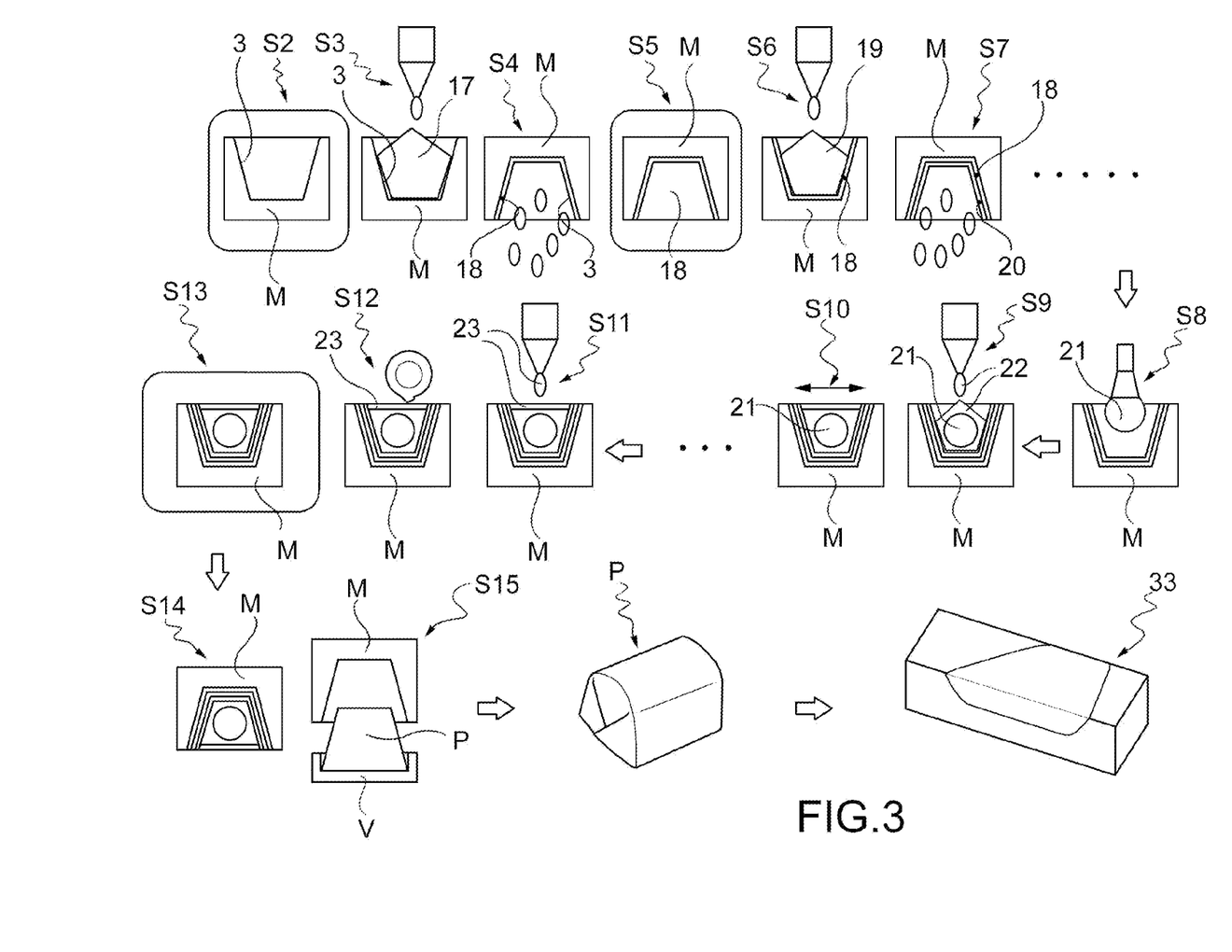
FIG. 3 is a schematic representation showing successive operations carried out in a flexible production system according to FIG. 1.

With reference to FIG. 1, a station S3 is provided downstream of the station S2, and comprises a pouring machine which, as shown schematically in FIG. 3, pours a predetermined quantity or dose of, for example, plain chocolate, indicated by 17 in FIG. 3, into the housings or cells 3 of the moulds M.

The station or device S3 is associated with an electronic unit indicated by C in FIGS. 1 and 4. The electronic unit C also has a structure similar to that of the units A and B described above. It therefore comprises a processor 9, with associated memory devices 10, transmission-reception interfaces 13, and at least one antenna or the like 15.

The pouring station or machine S3 can be of a type which can be controlled selectively in a plurality of predetermined modes, in order to form a corresponding plurality of different product types. Its electronic unit C is correspondingly designed to selectively modify the mode of execution of at least one of its operations, on the basis of operating information which this unit reads from the memory devices 4 associated with each mould M passing through it, or on the basis of information transmitted to it by the electronic unit of the terminal station S16. The processor 9 of the unit C can conveniently be connected to one or more sensors, designed to supply electrical signals indicating the values of corresponding physical and/or chemical quantities which are monitored, such as the temperature of the poured material, etc. If necessary, these values can be transcribed by the unit C into the memory devices 4 associated with the various moulds M passing through the station S3, and/or can be transmitted to the terminal station S16. The data transcribed into the memory devices of the mould in this way can be used, for example, to describe the suitability of the product poured into this mould for subsequent applications, for the purpose of forming different types or "flavours" of products.

If the pouring machine S3 can selectively pour different types of product, for example plain chocolate, milk chocolate, white chocolate, etc., the associated unit C can comprise an input device 17 which enables an operator to input data identifying the products which are loaded into the station or machine S3 and which can, therefore, be poured into the moulds M. The device 17 is connected to the processor 9.

The unit C can also conveniently be designed to transfer data identifying the pouring machine into the memory devices 4 of the moulds M served by it, for the purposes of what is known as process traceability.

In the example of the production system shown in FIG. 1, a draining station S4 is provided downstream of the pouring station S3, the moulds M being inverted in the station S4, as shown schematically in FIG. 3, so as to drain off by gravity the excess of the material 17 which was poured previously. After draining, a so-called "shell" 18, formed by the product poured into the station S3, remains on the walls of each housing or cell 3.

The station S4 is also associated with an electronic unit, indicated by D in FIGS. 1 and 4. This unit has a structure similar to that of the electronic units A and B described above.

The station S4 is followed by a cooling station S5, in which the shell 18 formed in each housing or cell of the moulds is hardened by reducing the temperature.

The station S5 is associated with an electronic unit, for example one of the type B described above.

Downstream of the station S5 there is provided a further pouring station S6, similar to the preceding station S3, and designed to pour a quantity of a material 19 in order to form a second shell in each housing or cell of the moulds (FIG. 3). The station S6 is associated with an electronic unit C as described above.

The station S6 is followed by a further draining station S7 which is similar to the station S4, and which, like S4, is provided with an electronic unit of the type D described above. As a result of the draining which takes place in the station S7, a second shell 20 is formed in each housing or cell of the moulds M on top of the shell 18 formed previously.

The material 19 poured in the station S6 can be identical to or different from the material poured in the pouring station S3.

Further shells or layers can be formed if necessary in the cells of the moulds, using materials identical to or different from those used previously, in further stations which are not shown in FIGS. 1 and 3.

In a subsequent station, indicated by S8, products 21, which can be selectively different from each other, such as hazel nuts or cherries, are deposited in the cells of the moulds M (FIG. 3). This station S8 is associated with an electronic unit which can be, for example, of the type D mentioned above. This electronic unit can, in particular, be designed to transcribe into the memory devices 4 of the moulds served by it, or to transmit directly to the unit S16, information or data identifying the batch containing the products 21 deposited in the individual moulds and the outcome of each individual operation. Thus, for example, if the mould M has not received a hazel nut in each of its cells, the fact that this operation has had a negative outcome will be written to the memory 4 of the mould, and consequently this mould will subsequently be "rejected".

In a subsequent station S9, a filling material 22 is deposited in the housings or cells of the moulds M, this material then being levelled in a subsequent vibration station S10.

The stations S9 and S10 are provided with corresponding electronic units, of types C and D respectively.

Downstream, there is a further pouring station S11, which pours a material 23 for forming the top which seals the filled chocolate formed in each cell of a mould. The material 23 is, for example, plain chocolate, or another type of chocolate. The pouring station 11 is similar to the preceding ones, and is associated with an electronic unit of type C.

The pouring station S11 is followed by a scraping station S12, which finishes the tops 23 of the chocolates by scraping. The station S12 is associated with an electronic unit of type D.

Downstream of the station S12 there is provided a cooling station S13, similar to the station S5 described above. The station S13 is associated with an electronic unit of type B.

In FIGS. 1 and 3, S14 indicates a station in which the moulds are subjected to vibration for the subsequent demoulding of the products P formed in them. This station is associated with an electronic unit of type D.

Finally, this is followed by a demoulding station S15, in which the finished products P are detached from the corresponding housings in the moulds M and are transferred to trays V moved by an auxiliary conveyor 30 towards wrapping and packaging stations such as those described below.

Each of the trays V can also conveniently be provided with a corresponding electronic identification device including memory devices, to and from which information or data can be (re)written and read by means of an associated antenna or the like. The demoulding station S15 is provided with an electronic unit, of type D for example, designed to transcribe into the memory devices associated with the trays V information or data concerning the modes of packaging the products transferred on these trays.

Figure 5:
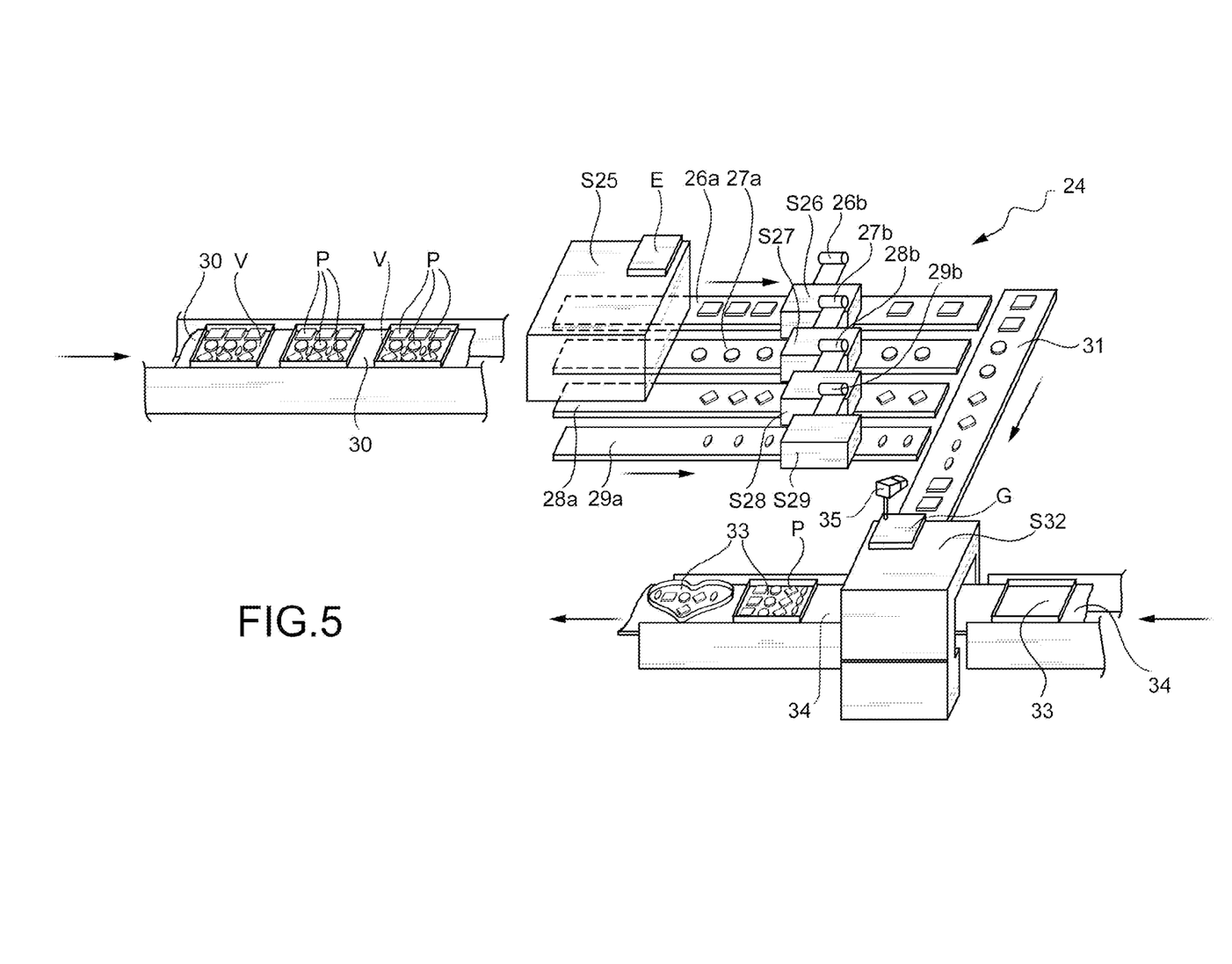
FIG. 5 is a schematic representation showing a wrapping and packaging system which can be associated with a flexible production system according to the invention, and particularly with the system shown in FIGS. 1 and 3.

The auxiliary conveyor 30 (FIG. 1) then transfers the trays V with the products P to wrapping and packaging stations, in which the products P can be, for example, individually wrapped and then packaged in groups in suitable packages, as shown schematically in the lower part of FIG. 5.

In FIG. 5, the number 24 indicates the whole of a wrapping and packaging line which comprises a station S25 for collecting and sorting the individual products P from the trays V carried by the conveyor 30. The station S25 is provided with an electronic unit E, similar to the unit described above and also indicated by E. This unit is designed to acquire from the memory devices of the incoming trays V, by means of an associated antenna or the like, the "mapping" of the arrangement of the different types of product P carried by these trays. The station S25 can therefore identify the position of each individual product on each incoming tray V, and can send it selectively to a corresponding wrapping station S26 or S27 or S28 or S29, according to the type (shape and/or "flavour") of the product, using associated conveyor belts 26a-29a. Each of the wrapping machines S26-S29 is provided with at least one corresponding reel 26b-29b of wrapping strip material which is customized, for example in its material and/or colour and/or design, to match the corresponding type of product. Thus, for example, products having a hazel nut filling can be wrapped with a brown material, while products having a pistachio filling are wrapped with a green material, and so on. In the solution shown by way of example in FIG. 5, the wrapped products P are then transferred, by a conveyor belt 31, to a packaging station S32, which transfers these products, in uniform groups or arranged according to predetermined mixes, to packages or boxes 33 carried by a conveyor 34. The machine or station 32 is also conveniently provided with an electronic control unit G coupled to devices 35, such as videocameras and the like, for identifying the incoming wrapped products. The electronic unit G also supervises the composition of the groups of products according to the predetermined assortments.

In an alternative solution, not shown in the drawings, the products P wrapped by the stations S26-S29 can be deposited by these machines, in uniform groups or in predetermined assortments, on additional trays similar to those described above. These additional trays are then transferred to a packaging station, similar to the station 32 described above and provided with an electronic unit which, by means of an antenna or the like, can acquire from the memory devices associated with said additional trays the mapping of the positions of the wrapped products conveyed by them. This electronic unit then enables the packaging station to make up packages with the desired assortments.

In FIG. 1, S16 indicates a final cancellation station, provided with an electronic unit indicated by E in FIGS. 1 and 4. This unit is structurally similar to the unit A of the input station S1. The unit E of the final station S16 is designed to acquire, from the memory devices 4 of the moulds M passing through it, information or data relating to the characteristics of the products formed in them, together with information on the precise position of each individual cell, and to transfer this information or data to the in-house network, using a communication interface device 11 and a communication line 12. The data transferred in this way can be stored in the company's archives to ensure the traceability of the products and of the production process, and for the purpose of subsequent use in any later stages of the production process, for example the stages of packaging and storage.

Alternatively, the final station S16 could be located at the start or at the end of the packaging line 24 of FIG. 5.

A further operation for which the unit E of the final station S16 can conveniently be designed is that of selectively cancelling, from the memory devices 4 of the moulds M, or of the trays V, or of the aforesaid additional trays if present, all the information which is no longer necessary, since it relates to the preceding production cycle.

In a variant embodiment, the functions of the validation and cancellation station could be provided by the station S15 of FIG. 1, and in this case the information relating to the wrapping and packaging operations could be processed by a final station in the wrapping and packaging line.

Although the illustration in FIG. 1 shows the initial input station S1 and the final validation and cancellation station S16 as separate and distinct entities, these stations could in fact be made in the form of a single station designed to implement all the functions described above.

Information or data distinguishing each mould M and its associated identification device T are stored indelibly (in other words, on a read-only basis) in the memory devices 4 of the identification device T associated with each mould M.

Information or data indicating the number of production cycles and/or specific operations to which the corresponding mould M has been subjected are also stored in these memory devices 4, in an updatable way (in other words, in a readable and rewriteable way).

The electronic unit associated with each of the various stations can conveniently be designed to transcribe information or data indicating its own identity into the memory devices 4 of the moulds passing through the station.

The electronic units of at least some of the aforesaid stations can also be designed to transcribe, into the memory devices 4 of the moulds M passing through them, information or data indicating the outcome of the operations in which these moulds are to be used in these stations, and/or to transmit said information directly to the control station S16.

Correspondingly, the electronic units of other stations can conveniently be designed to allow the execution of the operations assigned to them only after they have read, from the memory devices 4 of the moulds M, information indicating the positive outcome of at least one predetermined operation executed by a preceding station, or only after they have received permission from the control station (S16 or other).

The electronic unit associated with a station, such as a pouring station, designed to supply a quantity of material from a certain batch to a mould, can conveniently be designed to transcribe into the memory devices associated with this mould the information or data identifying the material supplied and/or its characteristics and/or its batch of origin.

The electronic unit associated with one or more stations can be connected to a system for detecting a condition of a mould making it unsuitable for use (for example, a dirty mould condition), and can be designed to transcribe into the memory devices 4 of the mould, in this case, information or data for preventing the use of this mould by the subsequent stations.

The system according to the invention allows the implementation of the flexible production of a plurality of types of moulded products which differ from each other.

For this purpose, the initial input station S1 transfers or writes to the memory devices 4 of each mould M operating information which comprehensively identifies the specific products to be formed in the mould and the corresponding forming operations. On the basis of this operating information, the subsequent stations are or are not activated, and carry out operations appropriate to the types of product which are to be formed in each mould.

Production can therefore be adapted in real time, in a highly flexible way, to the requirements of production and of the producing company, thus overcoming the rigidity and inefficiency of conventional systems of production in successive uniform batches.

In the flexible production system described up to this point, each mould can be used to form a specific product, in the sense that the same product is formed on each occasion in all the housings or cells of a mould.

In a variant embodiment, at least some of the moulds M can allow the forming of different products, in other words products diversified within a single mould, in predetermined specific areas of the mould. In this case, the input station S1 is designed to transcribe into the memory devices 4 associated with these moulds the information indicating the specific products to be formed in each of the said areas, and the corresponding forming operations.

In this way, the flexibility of production can be increased further.

Clearly, provided that the principle of the invention is retained, the forms of application and in particular the details of construction can be varied widely from what has been described and illustrated purely by way of a non-limiting example, without thereby departing from the scope of the invention as defined by the appended claims.

The invention claimed is:

1. System for the flexible production of a plurality of types of food products formed in moulds, which may differ from each other in their shape or their composition, particularly chocolate-based products, comprising:

a conveyor for conveying in sequence a plurality of moulds along a predetermined production path on which is located a plurality of stations, each of which can execute at least one corresponding operation;

each mould including a plurality of cells in which food products may be produced and carrying a corresponding electronic identification device including memory devices from and to which information or data relating to production of food products in the respective mould can be read and written without contact, by means of an associated antenna;

each station being provided with at least one corresponding electronic unit including a processor, having associated memory devices and at least one antenna and designed to read or write information or data from or to the memory devices of a mould passing through the station;

the system comprising at least one initial input station, and at least one intermediate station adapted to be controlled selectively in a plurality of predetermined modes for the forming of a corresponding plurality of different food product types, the electronic unit of this station being capable of selectively modifying the mode of execution of at least one of its operations, in accordance with operating information relating to production of food products read from the memory devices associated with each mould passing therethrough;

the system being characterised in that the electronic unit of said initial input station is designed to transfer or write to the memory devices of each mould passing therethrough operating information identifying the food products to be formed in the mould and relating to the corresponding forming operations, in that at least some of the moulds allow different food products to be formed in a portion of the plurality of cells in predetermined specific areas of the mould, and in that said input station is adapted to transcribe into the memory devices associated with said at least some moulds information indicating the specific food products to be formed in each of said areas and the corresponding forming operations.

2. System according to claim 1, in which the memory devices associated with the moulds are of the rewriteable type, and the system also comprises a final control, validation and cancellation station, which can selectively cancel information or data in the memory devices of each mould passing through it, in order to allow said memory devices to be used in subsequent production cycles.

3. System according to claim 2, in which the electronic unit of at least one intermediate station can selectively modify the mode of execution of at least one operation of this station on the basis of information transmitted by the electronic unit of said final station, or in order to store or transmit to a predetermined communication network the information of interest.

4. System according to claim 2, in which the final station is adjacent to or combined with the initial input station.

5. System according to claim 1, in which information or data distinguishing the mould and the associated identification device is stored in a readable way in the memory devices of the identification device associated with each mould.

6. System according to claim 1, in which information or data indicating the progressive number of food production cycles or specific operations to which the mould has been subjected is stored in an updatable way in the memory devices associated with each mould.

7. System according to claim 1, in which the identification device associated with each mould additionally comprises at least one sensor for supplying electrical signals indicating the value of a corresponding physical or chemical quantity which is monitored, said value being transcribed into the memory devices associated with the mould or being intended to be transmitted to the control unit of a control station.

8. System according to claim 1, in which the electronic unit of one or more stations is designed to transcribe information or data defining its identity into the memory devices of a mould passing it.

9. System according to claim 8, in which the electronic unit of one or more stations is designed to transcribe into the memory devices of a mould passing it, or to transmit to the electronic unit of a control station, information or data indicating the outcome of the operation to which this mould is to be subjected by it.

10. System according to claim 9, in which the electronic unit of a station is designed to allow the execution of the corresponding operation on a mould, after information indicating the positive outcome of a predetermined operation executed by a preceding station has been read from the memory devices of this mould, or following a permission signal sent by a control station.

11. System according to claim 8, in which the electronic unit of a station which is intended to supply a material from a predetermined batch to a mould is designed to transcribe information or data identifying this batch into the memory devices of this mould.

12. System according to claim 11, in which the electronic unit of said one or more stations is designed to transcribe information or data identifying the supplied material or its characteristics into the memory devices of a mould passing it.

13. System according to claim 1, in which the electronic unit of a station is connected to at least one sensor for supplying it with electrical signals indicating the value of a corresponding physical or chemical quantity which is monitored, said unit being designed to transcribe said value into the memory devices of a mould passing it, or to transmit this value to the electronic unit of a control station.

14. System according to claim 1, in which the electronic unit of a station is designed to detect a condition of a mould which makes it unsuitable for use, and, in this case, to transcribe into the memory devices of the mould, or to transmit to the electronic unit of a control station, information or data for preventing the use of this mould by the subsequent stations.

15. System according to claim 1, comprising at least one demoulding station in which the finished food products carried by the moulds are detached from the corresponding housings of said moulds and are transferred to trays moved by an auxiliary conveyor towards packaging stations; each of said trays carrying a corresponding electronic identification device, including memory devices to and from which information or data can be (re)written and read by means of at least one antenna associated with the device; the electronic unit of the demoulding station being designed to transcribe into the memory devices associated with said trays information or data relating to modes of packaging the products transferred on said trays.

16. System according to claim 15 additionally comprising a station for collecting, sorting and wrapping the food products carried by the trays of the auxiliary conveyor, said station being provided with an electronic control unit for identifying the individual trays and the positions of the individual products contained in them and for causing the selective sorting of said products into corresponding wrapping machines, in accordance with instructions sent from a control station.

17. System according to claim 16, in which the wrapping machines are designed to deposit the wrapped products, in predetermined arrangements, on additional trays intended to be sent to a packaging station which is designed to make up packages containing desired assortments of said products.

18. System according to claim 16, in which the wrapping machines are designed to deposit the wrapped products on associated conveyor means for conveying them in sequence to a packaging station which is designed to make up packages containing desired assortments of said products.

19. System according to claim 16, in which the wrapping machines are designed to deposit the wrapped products on the associated conveyor means in such a way that said products are conveyed in the loose state to the packaging station, which is provided with identification means for recognizing said products and enabling them to be combined selectively in order to make up packages containing desired assortments.

20. System according to claim 1, additionally including a final station designed to collect from the memory devices of the moulds, and to transfer to storage memory means, data relating to the food products formed and to the corresponding operations carried out, and any necessary further information or data which can be used for tracing the products and their constituents or for tracing the manufacturing process.

21. Mould for use in a system according to claim 1, provided with an electronic identification device including memory devices from and to which information or data can be read and written without contact, by means of an associated antenna.

22. Station or machine, particularly a wrapping or packaging station or machine for use in a system according to claim 1, provided with at least one corresponding electronic unit including a processor, having associated memory devices and at least one antenna, and designed to read or write information or data from or to the memory devices of a mould passing through the station or machine.

* * * * *